Jan. 12, 1971  T. A. HOSKINS  3,554,640
DRIVE COUPLING SYSTEM

Filed Nov. 25, 1968  3 Sheets-Sheet 1

INVENTOR
THOMAS A. HOSKINS

BY *Sughrue, Rothwell, Mion, Zinn & Macpeak*
ATTORNEYS

Jan. 12, 1971 T. A. HOSKINS 3,554,640

DRIVE COUPLING SYSTEM

Filed Nov. 25, 1968 3 Sheets-Sheet 2

INVENTOR
THOMAS A. HOSKINS

BY *Sughrue, Rothwell, Mion, Zinn & Macpeak*
ATTORNEYS

Jan. 12, 1971

T. A. HOSKINS 3,554,640

DRIVE COUPLING SYSTEM

Filed Nov. 25, 1968

INVENTOR
THOMAS A. HOSKINS

BY *Sughrue, Rothwell, Mion, Zinn & Macpeak*

ATTORNEYS

United States Patent Office 3,554,640
Patented Jan. 12, 1971

3,554,640
DRIVE COUPLING SYSTEM
Thomas A. Hoskins, Lexington, Ky., assignor to International Business Machines Corporation, Armonk, N.Y., a corporation of New York
Filed Nov. 25, 1968, Ser. No. 778,492
Int. Cl. G03g 15/00
U.S. Cl. 355—8                                    20 Claims

ABSTRACT OF THE DISCLOSURE

A drive coupling system in a xerographic machine for synchronizing the reciprocation of a copy carriage with a rotatable xerographic drum. A clutch releasably couples a driven member to a rotatable drive in synchronism with a specific point on the rotatable drive to provide limited movement of the driven member from a first to a second position in one direction. An additional drive consisting of a spring motor drives the driven member in the opposite direction to the first position. A cam member controls the acceleration and deceleration of the driven member from and to the first position.

BACKGROUND OF THE INVENTION

(1) Field of the invention

This invention relates to a drive coupling system wherein a linearly reciprocating member is coupled to and driven by a rotating member for movement in one direction and subsequently uncoupled therefrom for movement in the opposite direction by a spring-type drive under the control of the rotating member.

More specifically, the invention relates to such a drive coupling system in a xerographic machine having a reciprocating copy carriage and a rotatable xerographic drum. Upon initiation of a copy cycle the carriage is spring driven under the control of the rotating drum from a start or load position to a start-of-scan position whereupon the carriage is coupled to the rotating drum for return scanning movement to the start or load position.

(2) Description of the prior art

Although it is old and well known in the art to couple a linearly reciprocating member to a constantly rotating member by means of a suitable coupling arrangement and uncouple the reciprocating member for spring biased movement in the opposite direction, such arrangements were subject to severe shocks due to the sudden starting and stopping of the reciprocating member. Although several efforts were made to dampen the shock attendant to the sudden acceleration of the reciprocating member, such damping arrangements generally rendered it impossible to achieve any degree of accuracy with respect to synchronization of movement between the rotating member and the reciprocating member.

In the prior art devices when the reciprocating member was returned by means of a spring force after being uncoupled from the rotating member the acceleration of the reciprocating member was generally uncontrolled and the reciprocating member was usually decelerated suddenly by contact with a fixed abutment. Although several of the prior art devices resorted to damping devices to retard the acceleration and cushioning devices to absorb the impact upon deceleration, it was generally impossible to accurately synchronize the final stopping position of the reciprocating member with respect to the rotation of the rotating member for subsequent operating cycles.

The aforementioned problems are particularly acute in xerographic machines since any undue vibration of the machine during the scanning period, including sudden stops and starts, results in a blurred image. Furthermore, in certain xerographic machines it is essential that the image be formed at the exact same position on the photoconductive surface of the drum. In order to start and stop the scanning operation in exact synchronization with predefined limits on the rotating drum it is necessary to accelerate and decelerate the reciprocating copy carriage very quickly. The prior art coupling arrangements were completely inadequate for these purposes since the objectionable jolt or vibration attendant to the sudden starting and stopping of the carriage adversely affected the quality of the reproductions.

SUMMARY OF THE INVENTION

The present invention provides a drive coupling system for controlled synchronization of a translating carriage and a rotating drum. The present drive system enables close synchronization to be achieved by introducing acceleration and vibration control at all points in the reciprocation cycle of the carriage. Such control will permit the prediction of the motion error during synchronization of the carriage and drum while minimizing the time and distance to start, stop and return the carriage to its initial starting point.

The present invention provides a coupling between a rotating member and a reciprocating member whereby the reciprocating member is quickly accelerated from a stationary position to the desired traversing speed in the minimum amount of time and distance with the minimum amount of shock and then positively driven in accurate synchronization with the rotating member.

The present invention also provides a spring driven means for moving the reciprocating member in the opposite direction after uncoupling from the rotating member at a predetermined point in the cycle with a positive acceleration and deceleration control directly dependent upon the speed of rotation of said rotating member.

DETAILED DESCRIPTION OF THE INVENTION

Figure 1:
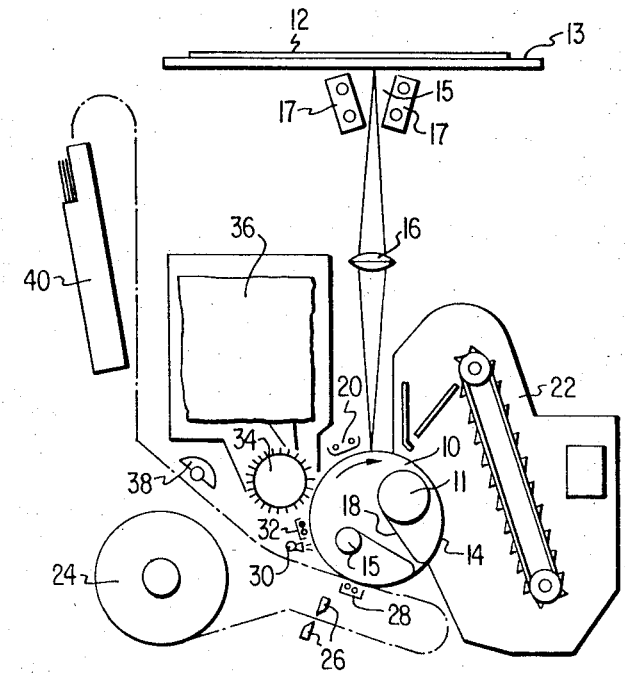
FIG. 1 is a schematic view showing the general arrangement of the elements of a copying machine provided with a reciprocating copy carriage and a rotating photosensitive drum.
Figure 4:
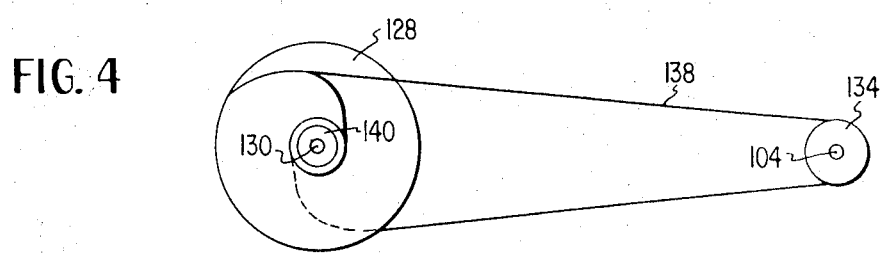
FIG. 4 is a schematic view showing the arrangement of the cables about the surfaces of the acceleration control device.

The general arrangement of the various elements which make up a copying machine is shown in FIG. 1. In copying machines of this type a sheet of copy to be reproduced is scanned and the image is directed onto a rotating drum having a photosensitive surface thereon. The drum 10 shown in FIG. 1 is provided with a renewable photoconductive surface 14 which is disposed on a film 18 which may be stored on rolls 11 and 15 within the hollow drum 10. After a predetermined number of copies have been made, the rollers 11 and 15 may be suitably indexed whereby a new length of film 18 is disposed about the surface of the drum 10 thereby providing a new photosensitive surface 14 on the drum.

A sheet of copy 12 to be reproduced is placed face down upon a traveling copy bed 13 which may be reciprocated in a manner more fully described hereinafter. The portion of the copy bed 13 upon which the copy 12 is placed is transparent so that light from light sources 17 will illuminate the copy as the copy bed 13 is reciprocated past the opening between the two light sources 17. The light reflected from the sheet of copy to be reproduced is directed downwardly and focused on the surface of the rotating drum 10 by means of the lens 16. A uniform negative charge is placed on the surface 14 of the film 18 by means of the main corona discharge unit 20. The charge on those portions of the surface 14 which receive the light will be dissipated thereby leaving a negative image of the copy to be reproduced on the surface 14. The surface of the drum then passes in close proximity to a cascade developer unit 22 wherein a plurality of carriers having positively charged toner adhered to the surface thereof are cascaded over the surface 14. The positively charged toner particles are then adhered to the negatively charged image on the surface 14.

A roll of paper 24 is dispensed by means of a suitable paper feed unit and the endless sheet of paper coming from the roll 24 is cut into suitable lengths by means of cutters 26. The individual sheets of paper are then passed by a suitable conveying means into intimate contact with the surface of the drum 10 in registration with the image formed thereon. The negatively charged transfer corona unit 28 transfers the positively charged toner particles from the image on the surface of the drum to the sheet of paper at this point. The sheet of paper adhering to the surface of the drum is then stripped from the drum by means of a puff of air from air nozzle 30. A positively charged preclean corona unit 32 is disposed adjacent the surface of the drum to dissipate any remaining negative charge on the surface of the film 18 to facilitate the removal of any remaining toner particles by means of the rotating brush 34. A suitable vacuum source is provided which draws the toner particles which are removed from the surface of the drum by the brush 34 into the disposable bag 36 and the surface of the drum is now ready to receive another negative charge from the main corona discharge unit 20. The sheet of paper having the toner particles thereon is then conveyed by suitable means to a fuser assembly 38 whereby the toner particles are permanently fixed to the paper. The paper is then conveyed to a suitable discharge rack 40.

Figure 2:
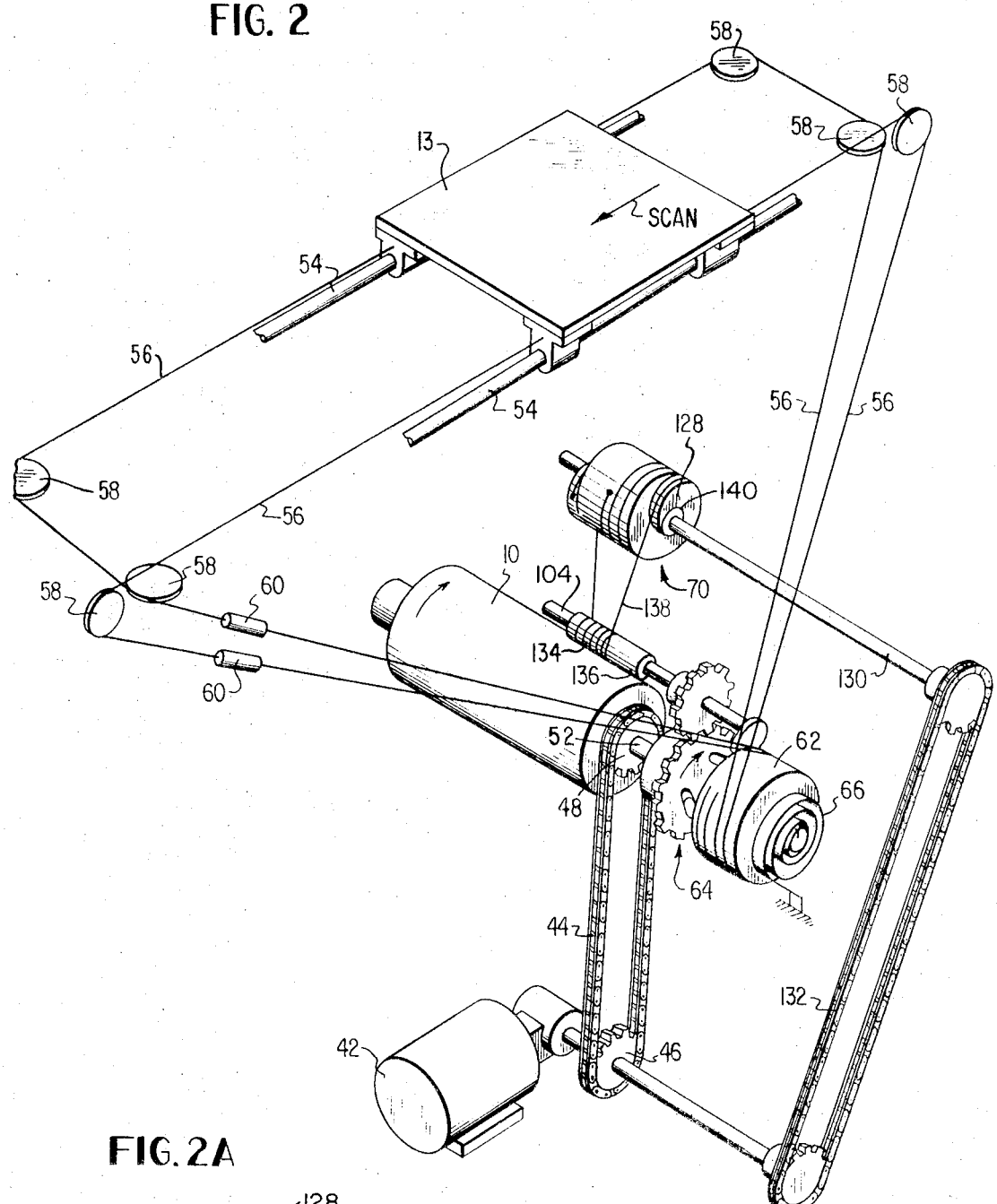
FIG. 2 is a perspective view showing the general arrangement of the drive coupling system for controlled synchronization of a translating carriage and a rotating drum.
Figure 2A:
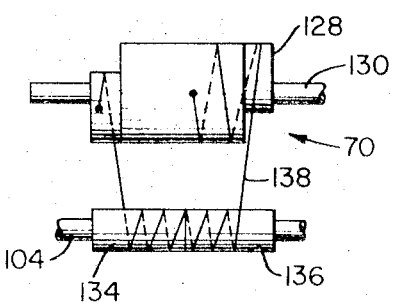
FIG. 2A is a side elevation view showing the relation of the cable and capstans near the end of the return stroke.

As mentioned previously, the copy bed 13 must traverse the light sources 17 to enable the copy material 12 thereon to be scanned and the image thereof directed onto the surface of the rotating drum. Therefore, it is absolutely essential that the traversing movement of the copy bed 13 be synchronized precisely with the rotation of the drum 10 when the image is being formed on the surface of the drum, the image will be an accurate and faithful reproduction of the original and will always be properly oriented for subsequent transfer to the sheets of paper which are fed from the paper supply unit. The general arrangement for coupling the carriage or copy bed 13 to the rotating drum 10 for movement in synchronization therewith is shown in FIG. 2.

The drum 10 is coupled to the drive motor 42 and driven thereby through a gear-tooth type belt 44 which is entrained over sprockets 46 and 48 on the motor output shaft 50 and the drum shaft 52, respectively. The drum 10 moves at a constant angular velocity under the control of the motor 42.

The carriage or copy bed 13 is slidably mounted on a pair of guide rods 54 which are mounted in parallel in the frame of the machine. The carriage 13 is reciprocated along the guide rods 54 by means of flexible tapes or cables 56. There are four cables 56, each of which is secured to a corner of the carriage 13 and extends parallel to the guide rods 54. The cables are entrained about suitably disposed pulleys 58 and are connected together by means of two elastomeric damping devices 60 to provide two loops which are entrained about the surface of sheave 62 which is journaled for rotation upon drum shaft 52. Thus, it is seen that as the sheave 62 rotates in opposite directions the carriage 13 will be reciprocated in opposite directions.

This particular system uses four cables 56 forming two loops to prevent rotational motion of the carriage 13 and to give a higher overall spring rate between the sheaves 62 and the carriage 13. Obviously, the size and number of cables or tapes 56 used depend on the spring rate between the drum 10 and the carriage 13 that is practical, since for a given disturbing force, the higher frequency system vibrates at lower amplitudes and can usually be damped out in less time. The elastomeric damping devices 60 provide the required damping of induced vibrations and maintain the desired tension in the system.

The sheave 62 is coupled to the drum 10 and driven by it through a positive type clutch coupling generally indicated at 64 and having a controlled acceleration output. Since it is desirable that the image synchronization begin at the same point on the drum for each cycle, the clutch has a definite fixed "pick up" point and also a kinematically controlled output which gives no variation in relative motion between the drum 10 and sheave 62 during acceleration of the sheaves 62.

For movement in the opposite direction, a spring motor comprised of a coil spring 66, connected at opposite ends to the sheave 62 and the shaft 52, is used to stop the carriage 13 at the end of its scanning motion and accelerate it in the return direction. A combination governor and deceleration device 70 is used to limit the maximum velocity on return and to brake the carriage 13 to a lower velocity so that the same controlled acceleration coupling of the drum 10 and the sheave 62 occurs on returning the carriage 13 to rest as was used to start the carriage 13 from rest.

Figure 3:
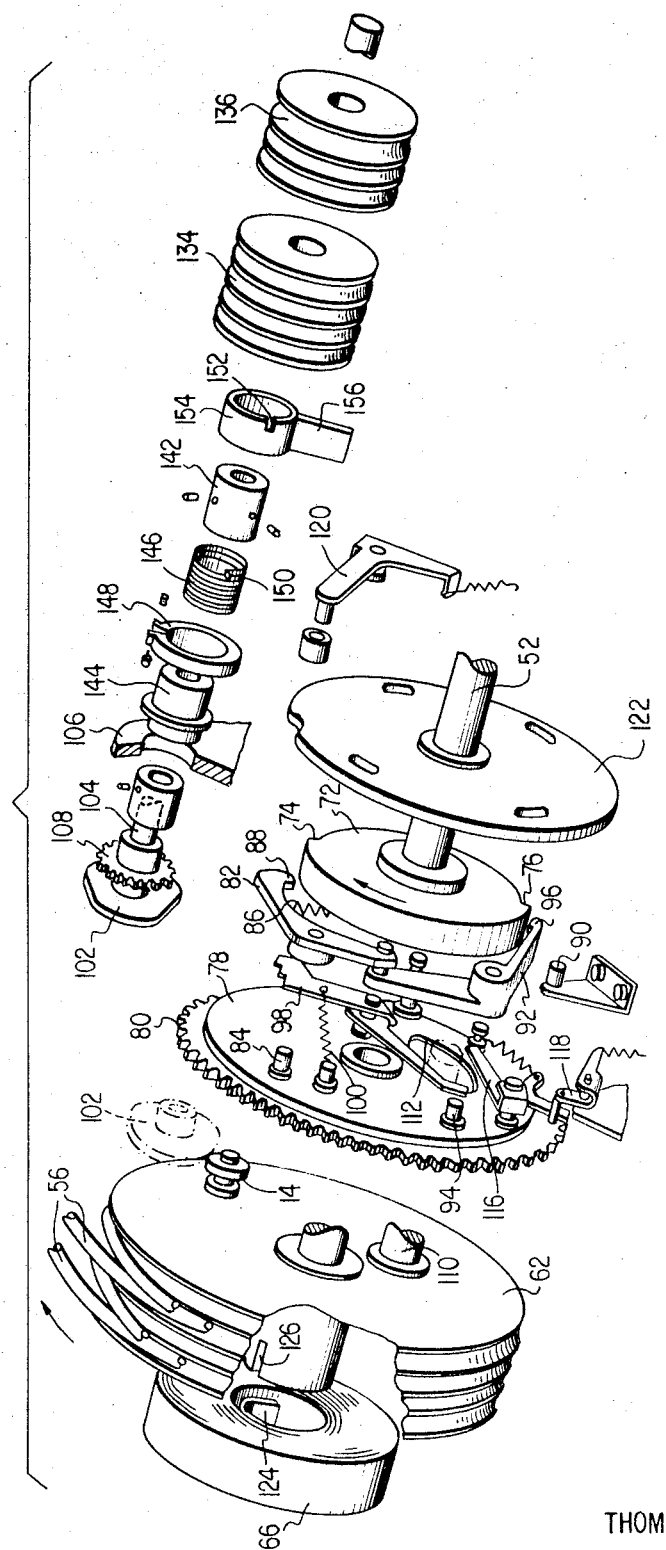
FIG. 3 is an exploded view showing the details of the coupling.

Referring now to FIG. 3, an exploded view is provided of the single-tooth, external pawl "dog" clutch which is used to provide the means for initiating the motion of the carriage in the scan direction and maintaining a fixed starting point relative to the drum surface after a copying cycle has been initiated and the copy bed has been moved in the return direction to the far end of the machine in preparation for the scanning movement. A drive disc 72 is splined onto the rotatable drum shaft 52 for rotation therewith and is provided with a pair of radially directed pawl engaging surfaces 74 and 76 which face in opposite directions. A clutch-output gear plate 78 is journaled on the shaft 52 for rotation thereon and is provided with a plurality of gear teeth 80 disposed about the circumference thereof.

A driving pawl 82 is pivotally mounted on stud 84 which is secured to the face of the gear plate 78. The driving pawl 82 is provided with a tooth 88 at one end thereof which is normally biased by spring 86 toward the circumference of drive disc 72 for engagement with pawl engaging surface 74 to provide the drive between the input shaft 52 and the output gear plate 78. The interface between the tooth 88 and the surface 74 are matching radii about the center of rotation of the pawl so that the motion remains synchronous during release of the pawl by release pin 90. A wedging type back-check pawl 92 is also pivoted on the gear plate 78 and is provided with a tooth 96 adapted to engage the pawl engaging surface 76 on the drive disc 72. The back-check pawl 92 is controlled by the tail of the driving pawl 82 and provides a rigid coupling between the clutch output gear plate 78 and the driving disc 72 when both pawls are engaged. The clutch is equipped with a storage latch 98 for the driving pawl 82. The storage latch 98 is pivoted on the gear plate 78 and is biased by spring 100 in a direction to store the driving pawl 82 out of the engaged position until the end of the return motion when the latch is released.

To provide controlled acceleration of the copy bed a carriage acceleration cam 102 is mounted for rotation with shaft 104. Shaft 104 is disposed parallel to the drum shaft 52 and is journaled in the support bracket 106. A spur gear 108 is also secured to the shaft 104 for rotation therewith and is disposed in mesh with gear teeth 80 on the gear plate 78. The acceleration cam 102 is used to control the motion of the cable sheave 62 which is journaled on the shaft 52 adjacent the gear plate 78 during acceleration of the sheave 62 from the rest position to a constant angular velocity matching that of the drum 10 which is secured to the shaft 52. A drive pin 110 extends from the cable sheave 62 and protrudes through a slot 112 in the clutch output gear plate 78. By rotating the gear plate 78 a fixed angle relative to the sheave 62, the gear plate 78 will begin to drive the sheave 62 when the drive pin 110 contacts the end of the slot 112 in the gear plate 78. This relative angular motion is used to accelerate the sheave 62 from rest through the accelerating cam 102, that is, during the time the gear plate 78 is rotating before the gear plate begins to drive the sheave 62 through the pin 110, it rotates the control cam 102 through pinion 108 on the auxiliary shaft 104. The sheave 62 is accelerated by the cam profile through the cam follower roller 114 which is secured to and extends from the side of the sheave 62. The cam 102 is designed so that at the position in which the clutch output gear plate 78 just begins to drive the sheave 62 through the pin 110, the sheave 62 matches the motion of the gear plate 78 in displacement, angular velocity and acceleration. Thus, for all practical purposes the clutch output gear plate 78 and the drive pin 110 come into contact at zero velocity, after which the gear plate 78 and sheave 62 move together as one unit. To assure that they remain together after contact, a locking wedge 116 moves into position behind the pin 110 to tightly wedge the pin against the end of the slot in the gear plate 78. This wedge 116 is released by an interposer arm 118 prior to separation of the pin 110 and the end of the slot 112 upon return of the carriage 13.

This cam arrangement is also used to decelerate the sheave 62 and bring it to rest at the end of the return motion of the carriage which occurs immediately prior to the acceleration of the copy bed in its scanning movement as described above. However, to maintain the same maximum accelerating force, the coupling velocity must be reduced to the same value as that used in scanning. The profile of cam 102 is designed to maintain a specified maximum acceleration that may be experienced by the carriage 13 and to minimize the induced vibrations. An analog computer may be used to predict the results of the cam input for the system. A spring urged detent arm 120 acts on the detent plate 122 which is mounted for rotation with the gear plate 78 to assure that the acceleration control cam 102 is driven to low dwell at constant velocity for small cam pressure angles. At the end of the return stroke the system is locked with the high dwell of the cam engaging follower 114.

As mentioned previously, a spring motor 66 is used to bring the carriage 13 to a stop at the end of a scan during a first copy cycle and to accelerate it in the return direction during a second copy cycle. The spring motor 66 is comprised of a coil spring having the outermost end secured to a suitable means and the inner end 124 of the spring between secured in a slot 126 in the hub of the sheave 62. This type of power drive will give an essentially constant acceleration which yields the minimum time and distance for a specified maximum allowable carriage acceleration. To maintain a specified maximum allowable carriage deceleration and also provide rapid return of the carriage, an auxiliary governing and braking device 70 is provided to reduce the higher velocity attained on return to a lower velocity corresponding to the coupling velocity in the scan direction.

The auxiliary governing and braking device 70 (FIG. 2) is provided with a capstan brake 128 which is mounted on the shaft 130 by an overrunning clutch. The shaft 130 is disposed parallel to the shafts 52 and 104 and is rotated at a constant angular velocity by means of timing belt 132 entrained about the sprockets on shaft 50 and 130. A pair of capstans 134 and 136 are secured to the shaft 104 for rotation therewith and are provided with the grooves of equal diameter on the surface thereof. Cable 138 is secured at one end to the capstan 128 at one end thereof adjacent the minimum diameter portion. The cable 138 is then wrapped about the variable diameter circumference of the capstan 128 adjacent said one end, about the capstans 134 and 136, back about the variable diameter circumference of the capstan at 128 adjacent the other end thereof and secured to the capstan 128 at the largest diameter portion thereof. Thus the capstan pays out cable 138 at one end during the return stroke while winding up the cable 138 at the other end at a variable rate while rotating at a constant angular velocity. This control cable 138 is then used to control the angular velocity of the control shaft 104. The velocity of capstan 128 is controlled by an overrunning type clutch 140 which governs and locks on the rotating shaft 130 when the sheave 62 and carriage 13 reach a predetermined maximum velocity on the return stroke. Thus, by properly designing the profile of the capstan 128 an optimum deceleration profile can be obtained for the carriage which is not subject to variation.

In order to stop the carriage 13 when a cycle or cycles of operation have been completed, a non-backlash or non-overthrow type latch is used to eliminate high accelerations upon impact of the latching surfaces. The device used to accomplish this is best shown in FIG. 3 wherein a torsion spring "clutch" is provided with a tapered output sleeve 142 which is secured to the shaft 104 by means of set screws or other suitable means. A fixed sleeve 144 is secured to the bracket 106 and one end of the coil spring 146 is clamped to the surface of the sleeve 144 by means of the clamp 148. The other end of the spring 146 is provided with a tab 150 which is disposed on the notch 152 of the sleeve 154. The sleeve 154 is provided with an extension 156 adapted to be controlled by a solenoid plunger or the like to unwrap the spring 146 from the tapered sleeve 142. Upon rotation of the shaft 104 during the scanning movement of the carriage, the sleeve 142 will overrun the spring but will be braked upon reversal of direction during return of the carriage when the latch sleeve 154 is released.

Figure 5:
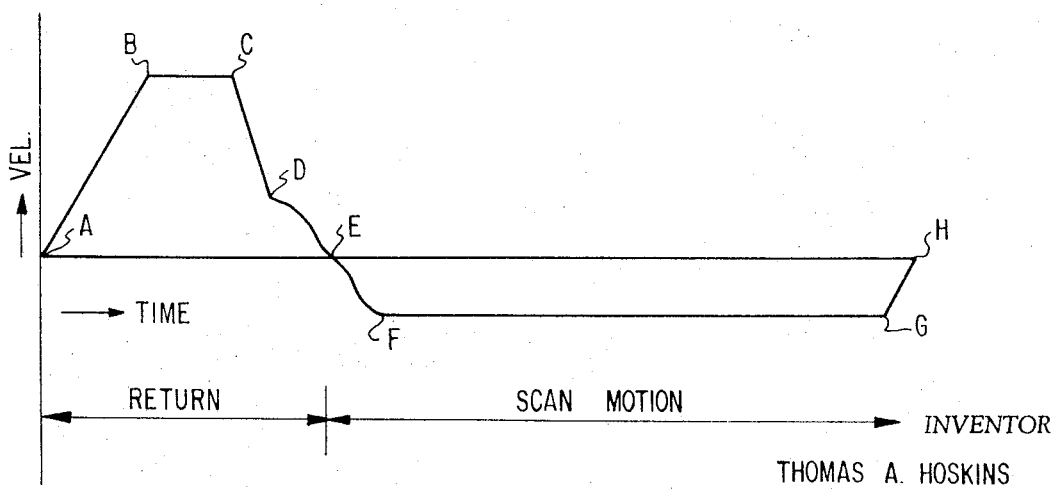
FIG. 5 is a graph of velocity versus time showing the velocity of the translating carriage during the return and scan portions of its reciprocating movement.

A brief summary of a complete cycle of operation will now be set forth. The relationship of the velocity of the moving carriage with respect to time throughout one complete cycle is shown in FIG. 5. Upon depression of a start button (not shown) the motor 42 will be energized and will rotate the drum shaft in the direction of the arrows shown in FIGS. 2 and 3. The depression of the start button coincides with point A on the graph of FIG. 5. Simultaneously with the energization of the motor, a solenoid (not shown) will be energized to actuate the sleeve 154 which controls the coil spring 146 in a counterclockwise direction as viewed in FIG. 3 so as to cause the spring 146 to unwrap and free the shaft 104 for rotation. The force of the spring motor 66, which was stored up during the rotation of the sheave 62 in the scanning direction on a previous cycle, will cause the rotation of the sheave to reverse thereby driving the carriage in the return direction from left to right as viewed in FIG. 2 from the load position to the start-of-scan position.

The acceleration of the carriage 13 in the return direction takes place from point A to point B on the graph and is limited at point B by the engagement of a cable 38 with the capstan 128 which is now constrained by the overrunning type clutch 140 for rotation with the shaft 130 at a constant angular velocity. The carriage 13 will move at a constant velocity from point B to point C on the graph and then, due to the surface configuration of the capstan 128, the carriage 13 will decelerate from point C to point D.

The rotation of the gear plate 78 and the acceleration cam 102 is also reversed on the scan stroke of the carriage. The sheave 62 is slowed down under the control of the acceleration cam 102 which, in this instance, acts as a deceleration cam. Near the end of the return stroke the locking wedge 116 is engaged by the interposer arm 118 and the locking wedge 116 is moved out of engagement with the pin 110 thereby allowing the pin 110 to move within the slot 112. The deceleration of the carriage 13 under the control of cam 102 takes place from point D to point E on the graph. As the pin 110 reaches the lefthand end of the slot 112 as viewed in FIG. 3, the pin 110 will contact the tail of the storage latch 98 to pivot the latch 98 against the force of the spring 100 thereby allowing the spring 86 to bias the tooth 88 on the drive pawl 82 into engagement with the driving surface 74 on the drive disc 72. Also, at this time, the tooth 96 on the check pawl 92 will be disposed in engagement with the surface 76 on the drive disc 72. Therefore, since motor 42 is rotating the drum 10 and the shaft 52 in the direction of the arrow on the drive disc 72, the gear plate 78 will also now begin to rotate in this direction for the scanning operation. It is noted that the position of the driving surface 74 is accurately referenced relative to the circumference of the drum 10 and therefore ensures that the copy bed or carriage will begin its scan at the same point relative to the drum during every copy cyle. This ensures that the image is not formed over the slot where the photosensitive material is pulled from and wound into the interior of the drum. Even if the copy bed returns to the start of scan position slightly ahead of time, due to the dynamics of the system, its travel in the scan direction is synchronized with the drum since this travel will not begin until driving surface 74 engages pawl 82.

At the beginning of the scan, indicated at E in FIG. 5, the acceleration cam 102 is disposed in engagement with the pin 114 on the sheave 62 so that as the gear plate 78 begins to rotate in the direction of the arrow on disc 72 in FIG. 3, the gear teeth 80 will rotate the gear 108 which is secured to the shaft 104 and thereby rotate the acceleration cam in a counterclockwise direction as viewed in FIG. 3. This rotation of the acceleration cam will initiate the rotation of the sheave due to the fact of its engagement with the pin 114 and accelerate the sheave 62 up to the angular velocity at which the drive disc 72 and the gear plate 78 are rotating. During the movement of the sheave 62 under the driving force of the acceleration cam 102 from point E to point F on the graph, the pin 110 will move relative to the length of the slot 112 and at the exact instant the rotation of the sheave is synchronized with the gear plate 78, the pin 110 will be disposed in the opposite end of the slot from which it started. The locking wedge 116 is then spring biased into a blocking position to lock the driving pin into unitary driving engagement with the gear plate 78. Thus, the pin 110 will be locked in driving engagement with the slot from point F to point G on the graph.

Upon reaching the end of the scanning stroke, the release pin 90 will engage the tail of the driving pawl 82 to disengage the tooth 88 from the drive surface 74. Due to the fact that the drive pin 110 is initially still disposed at the end of the slot out of engagement with the tail of the storage latch 98, the storage latch 98 will be biased in the direction to engage the disengaged driving pawl 82 and hold the driving pawl out of engagement with the driving disc. The force of the spring 66 will then quickly bring the sheave to a smooth stop over the time period between points G and H shown on the graph.

If only a single copy is to be made and only a single return and scan cycle is to be performed by the carriage, a switch will be activated de-energizing the solenoid which controls the coil spring 146. With the spring 146 freed by the de-energization of the solenoid the spring 146 will wrap tightly about the shaft to act as a brake member and prevent return motion of the sheave after the coil spring 66 has slowed the carriage to a stop at the loading position.

If additional copies are to be made and a plurality of cycles are to be run in sequence, the motor will remain energized and, to permit continuous reciprocation of the copy bed in the manner above-described, the solenoid will be energized at least during the time when the copy bed or carriage reaches the end of a scan motion and is moving in the return direction. While the drive coupling system of the present invention has been described as driving a reciprocating carriage which transports the copy past a slit scanning station, it may also be used to reciprocate the lens and/or light carriage in a xerographic machine where the document to be copied is placed on a stationary and transparent platen and scanned by an optical system comprising a reciprocating lens and, if desired, reciprocating light sources.

What is claimed is:

1. A drive coupling system comprising first drive means, driven means, clutch means for releasably coupling said driven means to said first drive means for limited movement of said driven means from a first position to a second position in one direction, second drive means for driving said driven means in the opposite direction to said first position, cam means for controlling the acceleration and deceleration of said driven means from and to said first position, respectively, and acceleration control means for controlling the acceleration and deceleration of said driven means in said opposite direction.

2. A drive coupling system as set forth in claim 1 wherein said acceleration control means is connected to said first drive means.

3. In a drive coupling system for reciprocating a driven means in timed relation from a rotatable drive means comprising a first rotatable drive member mounted for rotation about a first axis, means for rotating said first member at a constant angular velocity, second rotatable means mounted for rotation on said first axis, clutch means for connecting said first and second members together for conjoint rotation, third rotatable means mounted for rotation about said first axis, lost motion means connecting said second and third rotatable members, cam means mounted for rotation about a second axis parallel to and spaced from said first axis, drive means for rotating said cam means in synchronization with said second rotatable member, cam follower means on said third rotatable member disposed in operable relation to said cam means for smoothly accelerating said third rotatable member into synchronous movement with said second rotatable member during initial rotation of said cam means, means for coupling said second and third rotatable members for conjoint rotation after synchronization and means for disconnecting said clutch means after a predetermined rotation of said first and second members.

4. In a drive coupling system as set forth in claim 3 further comprising spring motor means connected to said third rotatable member for rotating said third rotatable member in the opposite direction and acceleration control means for limiting the acceleration of said third rotatable member by said spring motor means.

5. In a drive coupling system as set forth in claim 4 wherein said acceleration control means is comprised of a variable profile capstan mounted for rotation about a third axis parallel to said first and second axes, means for limiting rotation of said capstan to a constant angular velocity, pulley means connected to said cam means for rotation about said second axis and cable means connected to said pulley means and disposed about the profile of said capstan.

6. In a drive coupling system as set forth in claim 5 wherein said means for rotating said capstan and said capstan are connected by means of a unidirectional coupling and further comprising brake means for stopping said rotatable members in a predetermined angular position.

7. In a drive coupling system as set forth in claim 3 wherein said clutch means is comprised of a pawl pivotally mounted on said second rotatable member and tooth means on the periphery of said first rotatable member.

8. In a drive coupling system as set forth in claim 3 wherein said lost motion means is comprised of a pin secured to said third rotatable member parallel to and spaced from said first axis and a slot in said second rotatable member.

9. In a drive coupling system as set forth in claim 3 further comprising driven means mounted for reciprocating movement and cable means connected to said driven means and disposed in driving relation with said third rotatable member for reciprocating said driven means in opposite directions.

10. In a copying machine of the type having a reciprocatable copy head, a rotatable xerographic drum and a drive coupling system for synchronizing the reciprocation of said copy bed with the rotation of said drum, said system comprising first drive means for rotating said drum at a constant angular velocity, clutch means for releasably coupling said copy bed to said drum for limited movement of said copy bed from a first position to a second position, second drive means for driving said copy bed in the opposite direction to said first position, cam means for controlling the acceleration and deceleration of said copy bed from and to said first position respectively, and acceleration control means for controlling the acceleration and deceleration of said copy bed in said opposite direction.

11. In a copying machine as set forth in claim 10 further comprising brake means adapted to stop said copy bed at said second position for the insertion and removal of copy.

12. In a drive coupling system for reciprocating a driven means in timed relation from a rotatable drive means, comprising clutch means for releasably coupling said driven means to said rotatable drive means in repeatable synchronization with a specific point on said rotatable drive means for limited movement of said driven means from a first position to a second position in one direction, additional drive means for driving said driven means in the opposite dairection to said first position, cam means for controlling the acceleration and deceleration of said driven means from and to said first position respectively and acceleration control means for controlling the acceleration and deceleration of said driven means in said opposite direction.

13. In a copying machine of the type having a reciprocatable carriage, a rotatable xerographic drum and a drive coupling system for synchronizing the reciprocation of said carriage with the rotation of said drum, said system comprising first drive means for rotating said drum at a constant angular velocity, clutch means for releasably coupling said carriage to said drum for limited movement of said carriage from a first position to a second positon, second drive means for driving said carriage in the opposite direction to said first position, and cam means for controlling the acceleration and deceleration of said copy bed from and to said first position respectively.

14. In a copying machine as set forth in claim 13 further comprising brake means adapted to stop said carriage at said second position for the insertion and removal of copy.

15. In a copying machine as set forth in claim 13 further comprising acceleration control means for controlling the acceleration and deceleration of said copy bed from said first position respectively.

16. In a copying machine as set forth in claim 13 further comprising means to release said clutch means for releasably coupling said carriage to said rotatable drum in repeatable synchronization with a specific point on said rotatable drum for limited movement of said carriage from said first position to said second position.

17. In a copying machine as set forth in claim 13 further comprising a first rotatable drive member mounted for rotation about a first axis, means comprising said first drive means for rotating said first member at a constant angular velocity, second rotatable means mounted for rotation on said first axis, said clutch means for connecting said first and second members together for conjoint rotation, third rotatable means mounted for rotation about said first axis and drivingly coupled to said carriage, lost motion means connecting said second and third rotatable members, cam means mounted for rotation about a second axis parallel to and spaced from said first axis, drive means for rotating said cam means in synchronization with said second rotatable member, cam follower means on said third rotatable member disposed in operable relation to said cam means for smoothly accelerating said third rotatable member into synchronous movement with said second rotatable member during initial rotation of said cam means, means for coupling said second and third rotatable members for conjoint rotation after synchronization and means for disconnecting said clutch means after a predetermined rotation of said first and second members.

18. In a drive coupling system as set forth in claim 17 wherein said second drive means comprises spring motor means connected to said third rotatable member for rotating said third rotatable member in the opposite direction and acceleration control means for limiting the acceleration of said rotatable member by said spring motor means.

19. In a drive coupling system as set forth in claim 18 wherein said acceleration control means is comprised of a variable profile capstan mounted for rotation about a third axis parallel to said first and second axes, means for limiting rotation of said capstan to a constant angular velocity, pulley means connected to said cam means for rotation about said second axis and cable means disposed about said pulley means and disposed about and connected to the profile of said capstan.

20. In a drive coupling system as set forth in claim 19 wherein said means for rotating said capstan and said capstan are connected by means of an unidirectional coupling and further comprising brake means for stopping said rotatable members in a predetermined angular position.

References Cited

UNITED STATES PATENTS 3,062,095   11/1962   Rutkus, Jr., et al. _____ 355—8

JOHN M. HORAN, Primary Examiner

R. A. WINTERCORN, Assistant Examiner

U.S. Cl. X.R.

355—14, 84, 102